US009614460B2

(12) United States Patent
Huang et al.

(10) Patent No.: US 9,614,460 B2
(45) Date of Patent: Apr. 4, 2017

(54) VOLTAGE COMPENSATING METHOD FOR CONVERTER

(71) Applicant: INDUSTRIAL TECHNOLOGY RESEARCH INSTITUTE, Hsinchu (TW)

(72) Inventors: Shu-Syuan Huang, Changhua County (TW); Yoshihiro Konishi, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 254 days.

(21) Appl. No.: 14/566,386

(22) Filed: Dec. 10, 2014

(65) Prior Publication Data

US 2016/0118911 A1   Apr. 28, 2016

(30) Foreign Application Priority Data

Oct. 24, 2014   (TW) .............................. 103136833 A

(51) Int. Cl.
*H02M 7/538* (2007.01)
*H02M 7/5387* (2007.01)
*H02M 1/38* (2007.01)

(52) U.S. Cl.
CPC .. *H02M 7/53871* (2013.01); *H02M 2001/385* (2013.01)

(58) Field of Classification Search
CPC ....... H02M 2001/385; H02M 7/53875; H02M 3/156; H02M 3/1588; H02M 7/53873;
(Continued)

(56) References Cited

U.S. PATENT DOCUMENTS 6,469,916 B1   10/2002   Kerkman et al.
7,589,506 B2   9/2009   Brown
(Continued)

FOREIGN PATENT DOCUMENTS

CN   1166087 A   11/1997
CN   102237848 A   11/2011
(Continued)

OTHER PUBLICATIONS

Dong-Hee Lee et al., A Direct Compensation Scheme of the Dead-Time Effect in PWM-VSI, IEEE, 2012, 1-6.
(Continued)

*Primary Examiner* — Adolf Berhane
*Assistant Examiner* — Henry Lee, III
(74) *Attorney, Agent, or Firm* — Locke Lord LLP; Tim Tingkang Xia, Esq.

(57) ABSTRACT

A voltage compensating method is applied to a converter for converting a DC voltage into an AC voltage. The converter includes a first switch module, a second switch module, and an inductor. In a first dead time period, detect a first current value related to the inductor. According to the first current value, calculate a second current value and a third current value related to the inductor. According to polarities of the first, second and third current values, determine an output mode of the converter indicating a voltage compensation model after the first dead time period. According to the voltage compensation model, the first current value, and the second current value or the third current value, calculate a voltage compensation value. In a second dead time period, adjust a switching time for the first switch module and the second switch module according to the voltage compensation value.

14 Claims, 9 Drawing Sheets

(58) Field of Classification Search
CPC ........ H02M 5/293; H02M 7/217; H02M 1/38; H02M 2001/0009; H02M 2001/0025; H02M 3/158; H02M 7/5387; H02M 7/53871; H02M 7/538466; H02M 7/5395
See application file for complete search history.

(56) References Cited

U.S. PATENT DOCUMENTS

| | | | |
|---|---|---|---|
| 2005/0029972 A1* | 2/2005 | Imai | B60L 11/14 318/400.04 |
| 2013/0193938 A1 | 8/2013 | Shook | |

FOREIGN PATENT DOCUMENTS

| | | |
|---|---|---|
| CN | 102651622 A | 8/2012 |
| CN | 102684536 A | 9/2012 |
| CN | 102882413 A | 1/2013 |
| CN | 103856093 A | 6/2014 |
| TW | 201036311 A1 | 10/2010 |
| TW | I335125 B | 12/2010 |
| TW | 201119204 A1 | 6/2011 |
| TW | 201312920 A1 | 3/2013 |
| TW | I390835 B1 | 3/2013 |
| TW | I416839 B | 11/2013 |

OTHER PUBLICATIONS

Trung-Kien Vu et al., A New Adaptive Dead-Time Compensation for Single-Phase Grid-Connected PV Inverter, IEEE, 2011, 923-930.

Hongliang Wang et al., An Adaptive Dead-time Compensation Method for Sinusoidal PWM-controlled Voltage Source Inverter with Output LC Filter, IEEE, 2011, 778-785.

Zixin Li et al., Dead-Time Compensation for VSI Based Power Supply with Small Filter Inductor, IEEE, 2009, 1519-1523.

Yong Wang et al., Mixed PWM for Dead-Time Elimination and Compensation in a Grid-Tied Inverter, IEEE Transactions on Industrial Electronics, 2011, 4797-4803, vol. 58, No. 10.

Intellectual Property Office, Ministry of Economic Affairs, R. O. C, "Office Action",Oct. 12, 2015, Taiwan.

* cited by examiner

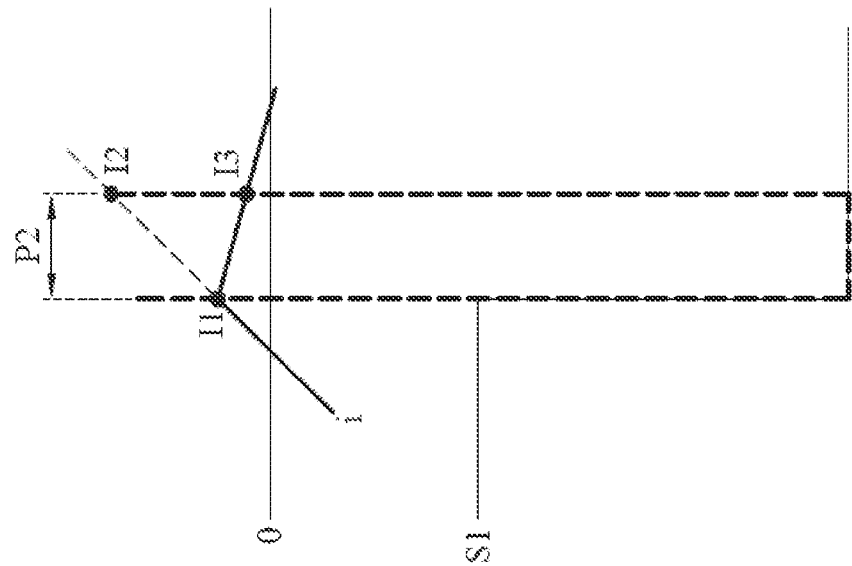
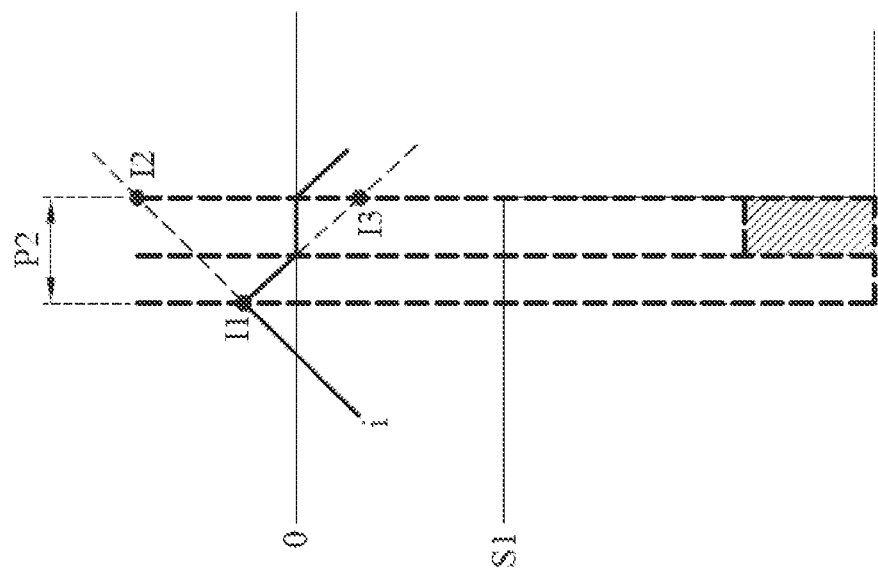
FIG. 5D
FIG. 5C

VOLTAGE COMPENSATING METHOD FOR CONVERTER

CROSS-REFERENCE TO RELATED APPLICATIONS

This non-provisional application claims priority under 35 U.S.C. §119(a) on Patent Application No(s). 103136833 filed in Taiwan, R.O.C. on Oct. 24, 2014, the entire contents of which are hereby incorporated by reference.

TECHNICAL FIELD

The disclosure relates to a voltage compensating method for a converter.

BACKGROUND

A grid-connected converter mainly converts DC power generated by solar power, into AC power that is synchronous to AC power of supply mains, and the grid-connected converter merges its AC power with the AC power of the supply mains to supply a load. Most grid-connected converters nowadays employ semiconductor switch components to perform bipolar sinusoidal pulse width modulation to convert input DC power into output AC power. After receiving switching signals, the semiconductor switch components usually take a delay time to completely be switched on or off.

In the case of a first switch module and a second switch module carried out by upper and lower semiconductor switch components of a bridge arm respectively, the first switch module and the second switch module take terms being switched on. In other words, when the first switch module is switched off, the second switch module will be switched on. When the second switch module is switched off, the first switch module will be switched on.

When the first switch module becomes off but the second switch module becomes on or when the first switch module becomes on but the second switch module becomes off, the semiconductor switch components need the delay time from receiving driving signals to actual action, and the delay time is varied with the material and fabrication process of semiconductor switch components. Since the duration of switching off the semiconductor switch components is longer than the duration of switching on the semiconductor switch components, the first switch module and the second switch module may simultaneously be switched on, resulting in the short-circuit to the grid-connected converter.

In order to prevent the first switch module and the second switch module from being switched on at the same time, a dead time period is set when some of the semiconductor switch components are being switched on and the other semiconductor switch components are being switched off. The dead time period is used for buffering the above delay time and is set according to the delay time.

However, during the dead time period, the grid-connected converter will have output voltage loss that distorts the output voltage waveform and weakens the grid-connected converter's performance.

SUMMARY

According to one or more embodiments, the disclosure provides a voltage compensating method applied to a converter for converting a DC voltage into an AC voltage and outputting the AC voltage to an external AC power source. The converter includes a first switch module, a second switch module, and an inductor. In one embodiment, the voltage compensating method includes the following steps. Detect a first current value related to the inductor during a first dead time period. According to the first current value, calculate a second current value and a third current value which related to the inductor. According to polarities of the first, second and third current values, determine an output mode of the converter after the first dead time period. The output mode indicates a voltage compensation model. According to the voltage compensation model, the first current value, and the second current value or the third current value, calculate a voltage compensation value. During a second dead time period, adjust a switching time for the first switch module and the second switch module according to the voltage compensation value.

BRIEF DESCRIPTION OF THE DRAWINGS

The present disclosure will become more fully understood from the detailed description given herein below for illustration only and thus does not limit the present disclosure, wherein:

FIG. 5C is a schematic diagram of the inductor current in a seventh output mode according to the second embodiment of the disclosure;

FIG. 5D is a schematic diagram of the inductor current in an eighth output mode according to the second embodiment of the disclosure;

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
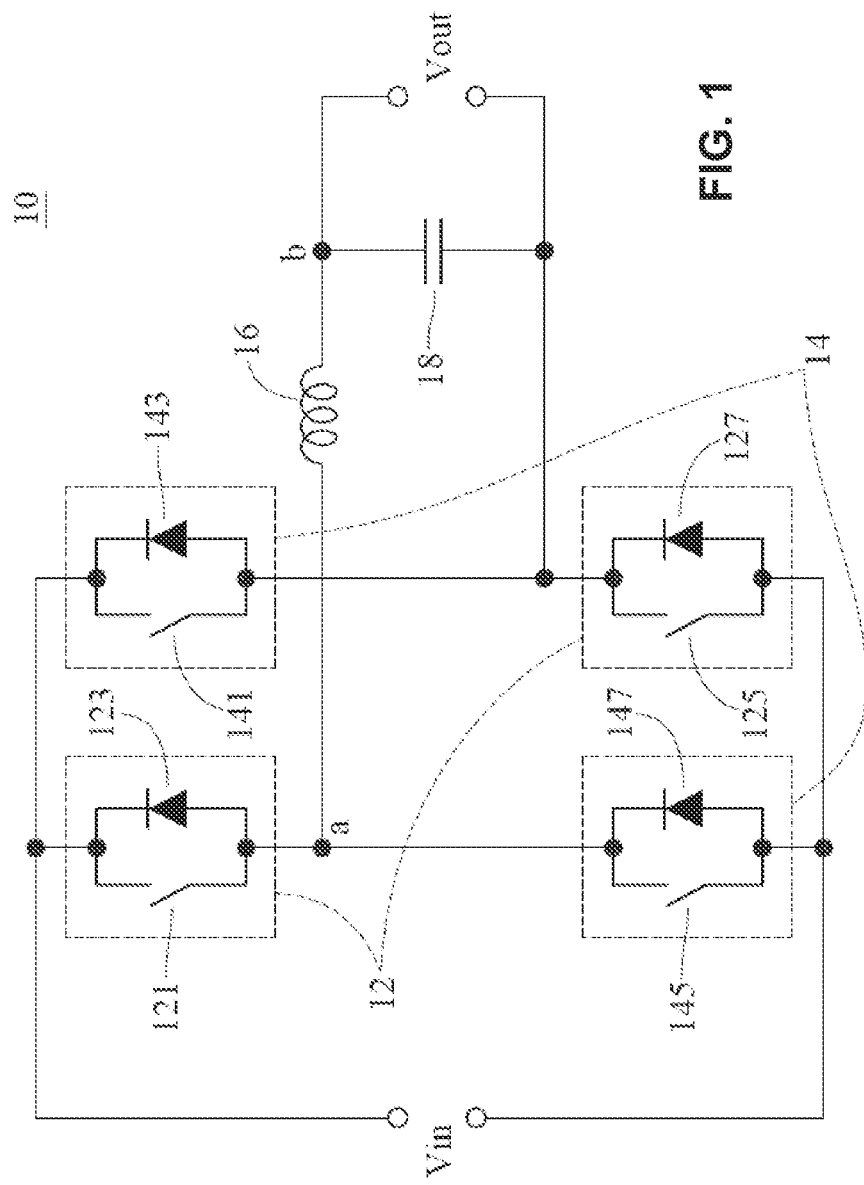
FIG. 1 is a schematic diagram of a converter according to an embodiment of the disclosure.
Figure 2:
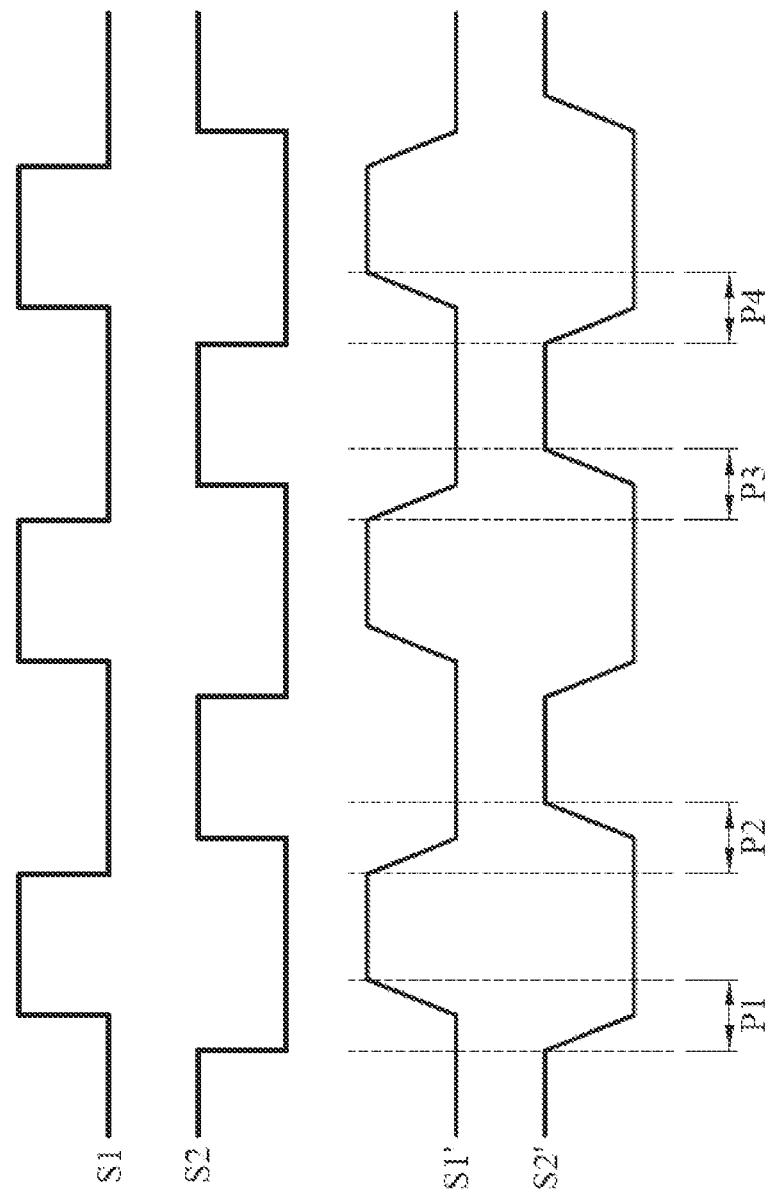
FIG. 2 is a schematic diagram of switching signals for the first switch module and the second switch module according to an embodiment of the disclosure.
Figure 3:
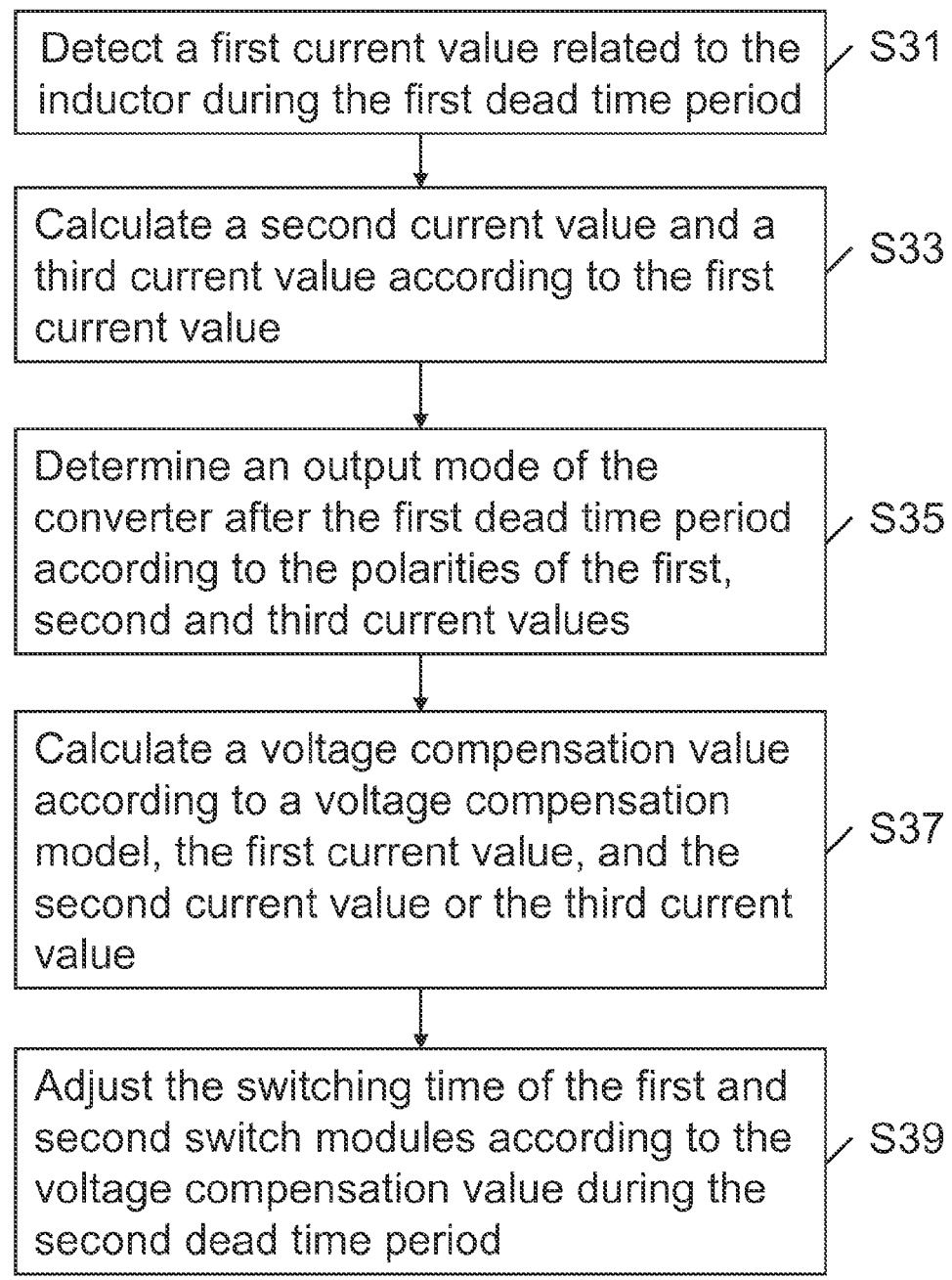
FIG. 3 is a flow chart of a voltage compensating method for a converter according to an embodiment of the disclosure.

The voltage compensating method in the disclosure can be applied to a converter. Please refer to FIG. 1 and FIG. 2. FIG. 1 is a schematic diagram of a converter according to an embodiment of the disclosure, and FIG. 2 is a schematic diagram of switching signals for the first switch module and the second switch module according to an embodiment of the disclosure. The converter 10 in FIG. 1 includes, for example, an input side Vin, a first switch module 12, a second switch module 14, an inductor 16, a capacitor 18, and an output side Vout. The converter 10 receives a DC voltage from solar power by its input side Vin, converts the DC voltage into an AC voltage, and merges the AC voltage into mains electricity (referred as an external AC power source) by its output side Vout that is connected with an supply mains in parallel. Moreover, the output side Vout of the converter 10 is connected with the capacitor 18 in parallel, and a first terminal of the output side Vout of the converter 10 is coupled with the inductor 16.

The first switch module 12 includes, for example, a first switch 121, a first diode 123, a second switch 125, and a second diode 127. The first switch 121 and the first diode 123 are connected in parallel. The cathode terminal of the first diode 123 is coupled with the first terminal of the input side Vin of the converter 10, and the anode terminal of the first diode 123 is coupled with the inductor 16. The second switch 125 and the second diode 127 are connected in parallel. The cathode terminal of the second diode 127 is coupled with a second terminal of the output side Vout of the converter 10, and the anode terminal of the second diode 127 is coupled with the second terminal of the input side Vin of the converter 10.

The second switch module 14 includes, for instance, a third switch 141, a third diode 143, a fourth switch 145, and a fourth diode 147. The third switch 141 and the third diode 143 are connected in parallel. The cathode terminal of the third diode 143 is coupled with the first terminal of the input side Vin of the converter 10, and the anode terminal of the third diode 143 is coupled with the second terminal of the output side Vout of the converter 10. The fourth switch 145 and the fourth diode 147 are connected in parallel. The cathode terminal of the fourth diode 147 is coupled with the inductor 16, and the anode terminal of the fourth diode 147 is coupled with the second terminal of the input side Vin of the converter 10.

In order to prevent the first switch module 12 and the second switch module 14 from being switched on at the same time, ideal switching signals for the first switch module 12 and the second switch module 14 are shown as a first signal S1 and a second signal S2 in FIG. 2. For example, the first switch module 12 corresponds to the first signal S1, and the second switch module 14 corresponds to the second signal S2. When the first switch module 12 is on (that is, the first switch 121 and the second switch 125 are switched on), the input side Vin of the converter 10, the first switch 121, the second switch 125, and the output side Vout of the converter 10 cooperate to form a loop. When the second switch module 14 is on (that is, the third switch 141 and the fourth switch 145 are switched on), the input side Vin of the converter 10, the third switch 141, the fourth switch 145, and the output side Vout of the converter 10 cooperate to form a loop.

In practice, because there is a delay time between the beginning of switching on the first switch module 12 and the end of switching off the first switch module 12 and between the beginning of switching on the second switch module 14 and the end of switching off the second switch module 14, actual switching signals for the first switch module 12 and the second switch module 14 are represented by a first signal S1' and a second signal S2' shown in FIG. 2. For instance, a first dead time period P1, a second dead time period P2, a third dead time period P3, and a fourth dead time period P4 are defined in the duration of switching on/off the first switch module 12 and the duration of switching on/off the second switch module 14.

Figure 4B:
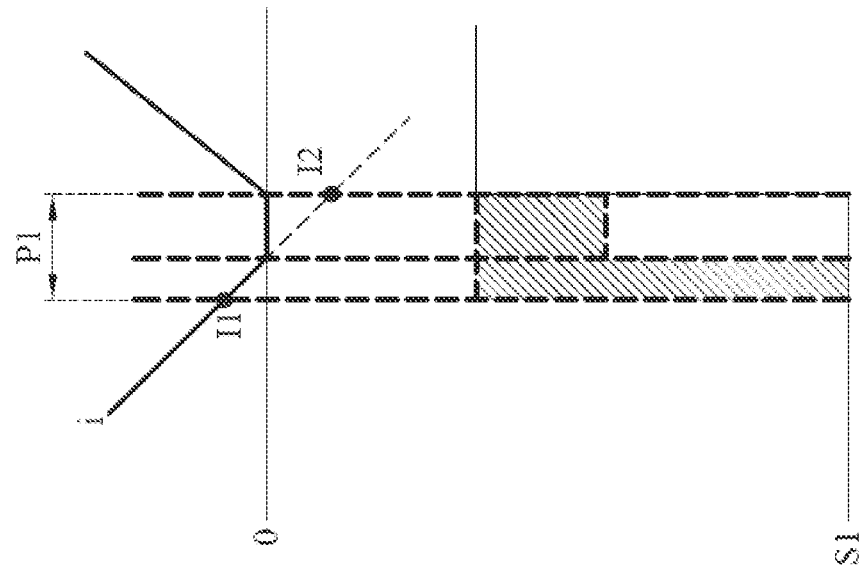
FIG. 4B is a schematic diagram of the inductor current in a second output mode according to the first embodiment of the disclosure.
Figure 4A:
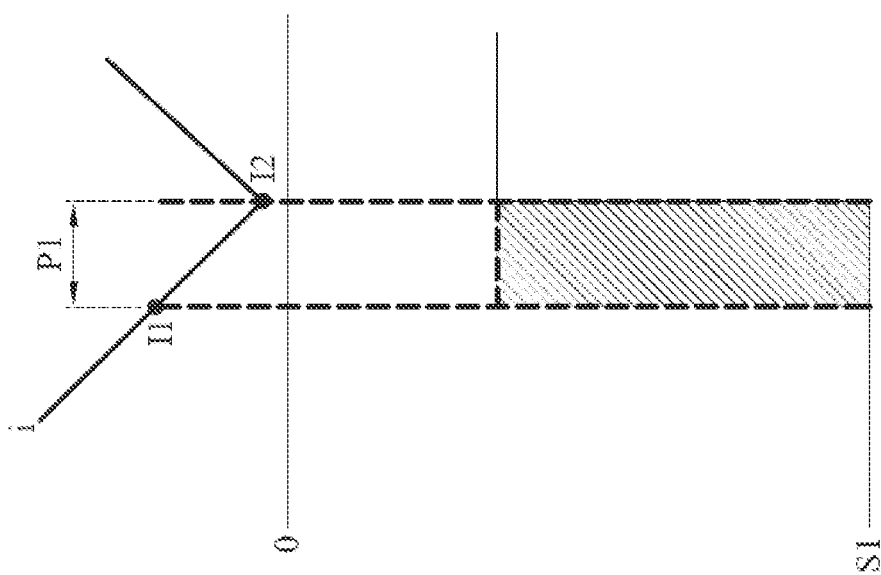
FIG. 4A is a schematic diagram of an inductor current in a first output mode according to a first embodiment of the disclosure.
Figure 4D:
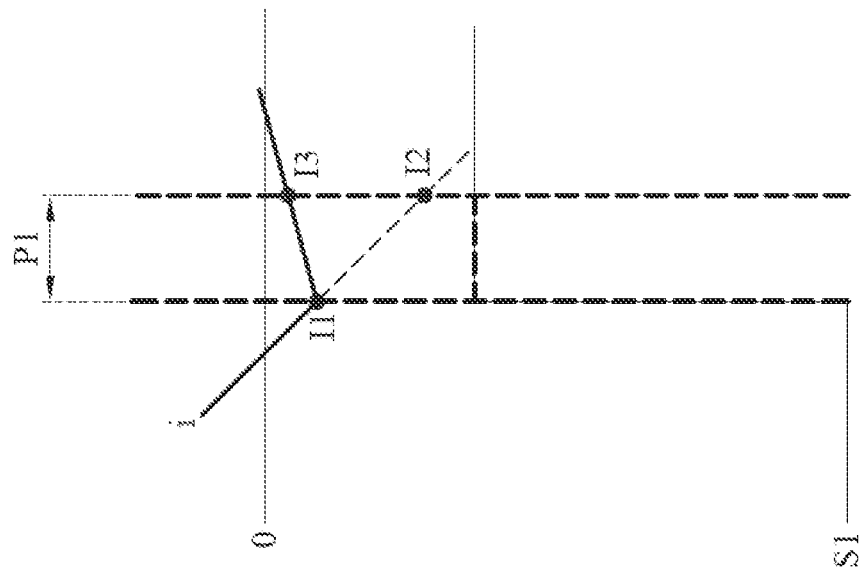
FIG. 4D is a schematic diagram of the inductor current in a fourth output mode according to the first embodiment of the disclosure.
Figure 4C:
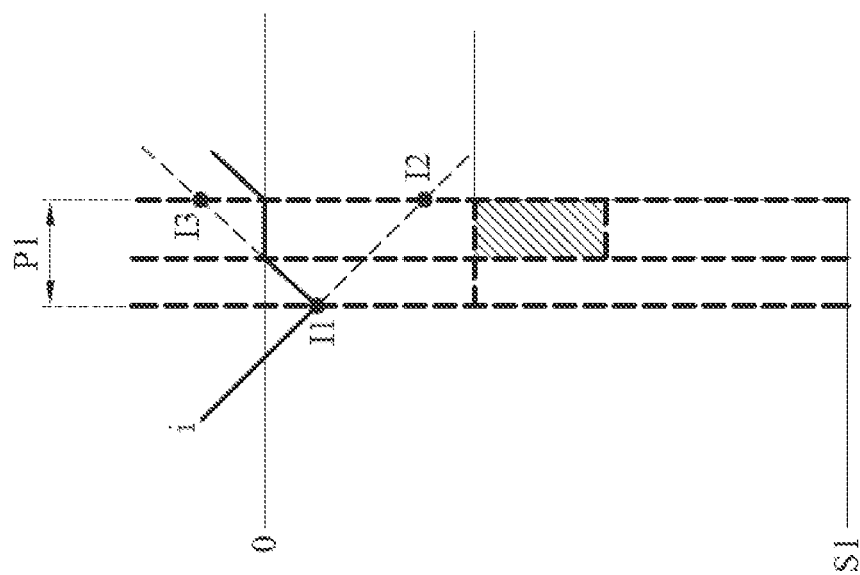
FIG. 4C is a schematic diagram of the inductor current in a third output mode according to the first embodiment of the disclosure.
Figure 5A:
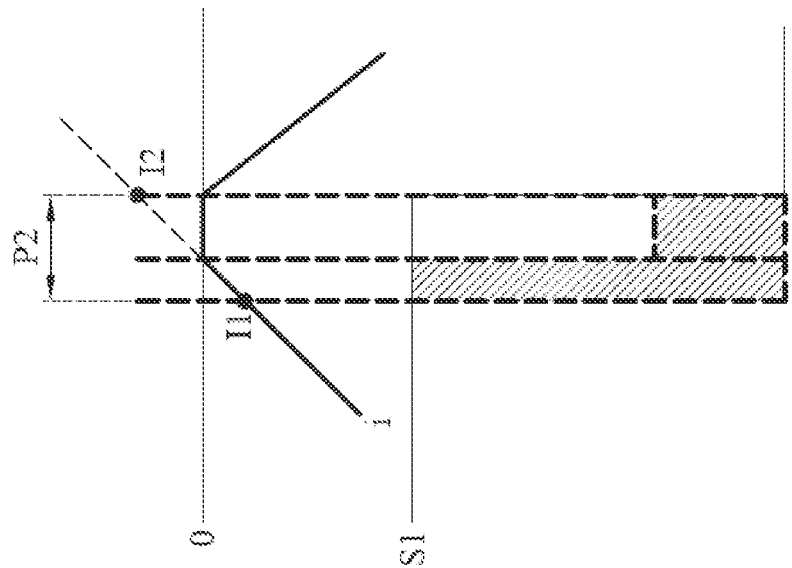
FIG. 5A is a schematic diagram of an inductor current in a fifth output mode according to a second embodiment of the disclosure.
Figure 5B:
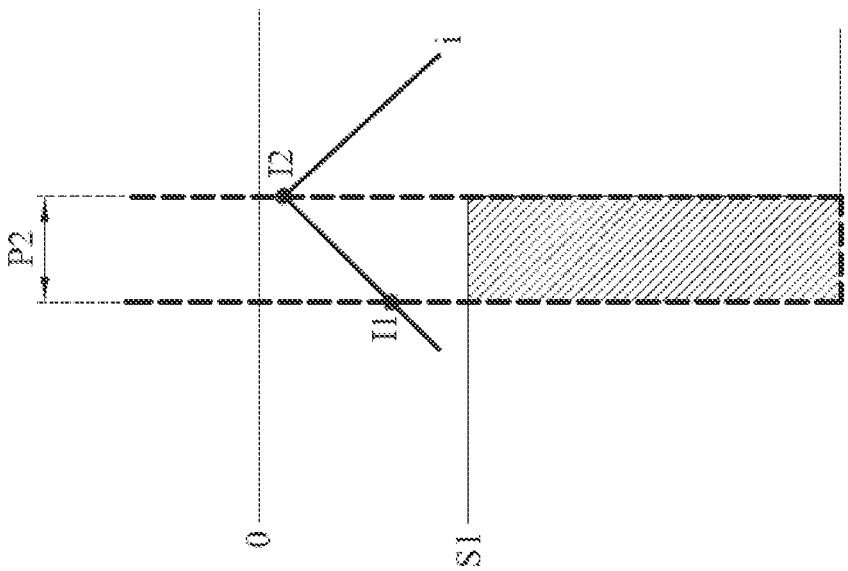
FIG. 5B is a schematic diagram of the inductor current in a sixth output mode according to the second embodiment of the disclosure.

Please refer to FIG. 1 to FIG. 5D, FIG. 3 is a flow chart of a voltage compensating method for a converter according to an embodiment of the disclosure, FIG. 4A is a schematic diagram of an inductor current in a first output mode according to a first embodiment of the disclosure, FIG. 4B is a schematic diagram of the inductor current in a second output mode according to the first embodiment of the disclosure, FIG. 4C is a schematic diagram of the inductor current in a third output mode according to the first embodiment of the disclosure, FIG. 4D is a schematic diagram of the inductor current in a fourth output mode according to the first embodiment of the disclosure, FIG. 5A is a schematic diagram of an inductor current in a fifth output mode according to a second embodiment of the disclosure, FIG. 5B is a schematic diagram of the inductor current in a sixth output mode according to the second embodiment of the disclosure, FIG. 5C is a schematic diagram of the inductor current in a seventh output mode according to the second embodiment of the disclosure, and FIG. 5D is a schematic diagram of the inductor current in an eighth output mode according to the second embodiment of the disclosure. To clearly describe the disclosure, the switching on/off of the first switch module 12 is described below as an example, and the switching on/off of the second switch module 14 can be deduced by referring to the switching on/off of the first switch module 12.

During the first dead time period P1, the second switch module 14 is switched off as the first switch module 12 is switched on. During the second dead time period P2, the first switch module 12 is switched off as the second switch module 14 is switched on. The following exemplary embodiment is related to the operation of the converter 10 in the case of switching on the first switch module 12 during the first dead time period P1 and switching off the first switch module 12 during the second dead time period P2. The operation of the converter 10 in the duration of switching off the second switch module 14 in the first dead time period P1 can be deduced by the operation of the converter 10 in the duration of switching off the first switch module 12 in the first dead time period P1 and the operation of the converter 10 in the duration of switching on the second switch module 14 in the first dead time period P1 can be deduced by the operation of the converter 10 in the duration of switching on the first switch module 12 in the first dead time period P1.

In step S31, during the first dead time period P1, the first switch module 12 in the converter 10 is ready to be switched on, and the converter 10 detects a first current value $I_1$ related to the inductor 16. For example, the first terminal of the input side Vin of the converter 10 in FIG. 1 is coupled with a positive terminal of a DC power source (e.g. solar power), and the second terminal of the input side Vin of the converter 10 is coupled with a negative terminal of the DC power source. Therefore, when the first switch module 12 is on but the second switch module is off, the inductor current will flow from a node a of the inductor 16 to a node b of the inductor 16, and a first current value $I_1$ of the inductor current will be positive. When the first switch module 12 is off but the second switch module 14 is on, the inductor current will flow from the node b of the inductor 16 to the node a of the inductor 16, and the first current value $I_1$ of the inductor current will be negative.

In step S33, calculate a second current value $I_2$ and a third current value $I_3$ according to the first current value $I_1$. For example, the second current value $I_2$ and the third current value $I_3$ can be obtained by the following equations:

$$I_2 = I_1 - \frac{E_s + E_{dc}}{L_f} T_{dt} \text{ and}$$

$$I_3 = I_1 - \frac{E_s + E_{dc}}{L_f} T_{dt},$$

where $I_1$ represents the first current value of the inductor current, $I_2$ represents the second current value of the inductor current, $I_3$ represents the third current value of the inductor current, $E_S$ represents an AC voltage of the supply mains, $E_{dc}$ represents the voltage on the input side Vin of the converter 10, $L_f$ represents an inductance value of the inductor 16, and $T_{dt}$ represents the first dead time period P1. The second current value $I_2$ and the third current value $I_3$ are obtained by determining the inductor current according to the first current value $I_1$ after the first dead time period P1.

In step S35, determine an output mode of the converter 10 after the first dead time period P1 according to the polarities of the first current value $I_1$, the second current value $I_2$ and the third current value $I_3$. The polarities of the first current value $I_1$, the second current value $I_2$ and the third current value $I_3$ indicate the flowing direction of the inductor current flowing through the inductor 16. For example, when the inductor current flows from the node a of the inductor 16 to the node b of the inductor 16, the polarity of the inductor current is positive, and when the inductor current flows from the node b to the node a of the inductor 16, the polarity of the inductor current is negative.

When the first current value $I_1$ and the second current value $I_2$ are positive in a first output mode, the polarity of the inductor current i of the inductor 16 is positive during the first dead time period P1 as shown in FIG. 4A. That is, the first current value $I_1$ is positive. Because the first switch module 12 takes a delay time to be switched on during the first dead time period P1, the inductor 16 will continue discharging during the delay of switching on the first switch module 12 until the first dead time period P1 ends. After the first dead time period P1 ends, the inductor 16 begins to be charged. Therefore, the converter 10 has voltage loss in the first output mode during the first dead time period P1, as shown in the oblique line region in FIG. 4A.

When the first current value $I_1$ is positive but the second current value $I_2$ is negative in a second output mode, the polarity of the inductor current i of the inductor 16 is positive during the first dead time period P1, as shown in FIG. 4B. That is, the first current value $I_1$ is positive. During the first dead time period P1, the inductor 16 continues discharging until the inductor current i becomes zero, that is, the output voltage of the converter 10 is approximately equal to the input voltage of the converter 10. Since the inductor 16 begins to be charged after the first dead time period P1 ends, the converter 10 has voltage loss in the second output mode during the first dead time period P1, as shown in the oblique line region in FIG. 4B.

When the first current value $I_1$ is negative but the third current value $I_3$ is positive in a third output mode, the polarity of the inductor current i of the inductor 16 is negative during the first dead time period P1 and the first current value $I_1$ is negative, as shown in FIG. 4C. Herein, the inductor 16 begins to discharge until the inductor current i of the inductor 16 becomes zero, and the output voltage of the converter 10 is approximately equal to the input voltage of the converter 10. Since the inductor 16 begins to be charged after the first dead time period P1 ends, the converter 10 has voltage loss in the third output mode during the first dead time period P1, as shown in the oblique line region in FIG. 4C.

When the first current value $I_1$ and the third current value $I_3$ are negative in a fourth output mode, the polarity of the inductor current i of the inductor 16 is negative during the first dead time period P1 and the first current value $I_1$ is negative, as shown in FIG. 4D. Herein, the inductor 16 begins to discharge. Since the polarity of the inductor current i of the inductor 16 is still negative after the first dead time period P1 ends, the converter 10 has no voltage loss in the fourth output mode during the first dead time period P1.

In step S37, calculate a voltage compensation value $\Delta V$ according to a voltage compensation model, the first current value $I_1$, and the second current value $I_2$ or the third current value $I_3$. The voltage compensation model is indicated by the output mode. For instance, as shown in FIG. 4A to FIG. 4D, when the first current value $I_1$ and the second current value $I_2$ are positive in the first output mode, the first output mode indicates the voltage compensation model as follows:

$$\Delta V = -4E_{dc} \frac{T_{dt}}{T_s}.$$

When the first current value $I_1$ is positive but the second current value $I_2$ is negative in the second output mode, the second output mode indicates the voltage compensation model as follows:

$$\Delta V = \frac{4E_{dc}I_1 + 2(E_{dc} - E_s)|I_2|}{I_1 + |I_2|} \frac{T_{dt}}{T_s}.$$

When the first current value $I_1$ is negative but the third current value $I_3$ is positive in the third output mode, the third output mode indicates the voltage compensation model as follows:

$$\Delta V = -\frac{2(E_{dc} - E_s)I_3}{|I_1| + I_3} \frac{T_{dt}}{T_s}.$$

When the first current value $I_1$ and the third current value $I_3$ are negative in the fourth output mode, the fourth output mode indicates the voltage compensation model as follows:

$$\Delta V = 0.$$

In view of the above four voltage compensation models, $\Delta V$ represents the voltage compensation value, $I_1$ represents the first current value of the inductor current, $I_2$ represents the second current value of the inductor current, $I_3$ represents the third current value of the inductor current, $E_S$ represents an AC voltage of the supply mains, $E_{dc}$ represents the DC voltage on the input side Vin of the converter 10, $T_{dt}$ represents the first dead time period P1, and $T_s$ represents a switch cycle of the first switch module 12 or of the second switch module 14. In this embodiment, the above four voltage compensation models are used for calculating the voltage compensation value ΔV when the first switch module 12 is switched on during the first dead time period P1.

In step S39, adjust the switched-off time point of the first switch module 12 during the second dead time period P2 according to the voltage compensation value ΔV that is the voltage loss caused by the first switch module 12 during the first dead time period P1. The process of adjusting the switched-off time point of the first switch module 12 during the second dead time period P2 will be described later.

In practice, the converter 10 detects the first current value $I_1$ of the inductor 16 not only during the first dead time period P1 as shown in FIG. 2 but also during the second dead time period P2, the third dead time period P3 or the fourth dead time period P4. For example, it is described below to detect the first current value $I_1$ of the inductor 16 during the second dead time period P2. During the second dead time period P2, the first switch module 12 is ready to be switched off, and the voltage compensating method will repeat step S31 to step S39 in FIG. 3 to calculate the voltage compensation value when the first switch module 12 is switched off.

In step S31, during the second dead time period P2, the first switch module 12 is ready to be switched off, and the converter 10 detects the first current value $I_1$ of the inductor 16. In step S33, according to the first current value $I_1$, calculate the second current value $I_2$ and the third current value $I_3$. The second current value $I_2$ and the third current value $I_3$ can be obtained by, for example, the following equations:

$$I_2 = I_1 - \frac{E_s - E_{dc}}{L_f} T_{dt} \text{ and}$$

$$I_3 = I_1 - \frac{E_s + E_{dc}}{L_f} T_{dt},$$

where $I_1$ represents the first current value of the inductor current, $I_2$ represents the second current value of the inductor current, $I_3$ represents the third current value of the inductor current, $E_S$ represents an AC voltage of the supply mains, $E_{dc}$ represents the voltage on the input side Vin of the converter 10, $L_f$ represents the inductance value of the inductor 12, and $T_{dt}$ represents the third dead time period P3. The second current value $I_2$ and the third current value $I_3$ are the current values of the inductor current passing through the inductor 16 and are estimated according to the first current value $I_1$ when the second dead time period P2 ends.

In step S35, determine the output mode of the converter 10 according to the polarities of the first current value $I_1$, the second current value $I_2$ and the third current value $I_3$ after the second dead time period P2. When the first current value $I_1$ and the second current value $I_2$ are negative in the fifth output mode, the polarity of the inductor current i of the inductor 16 is negative during the second dead time period P2, as shown in FIG. 5A. Herein, the first switch module 12 is delayed to be switched off during the second dead time period P2, and the inductor 16 continues discharging during the delay of switching off the first switch module 12 until the second dead time period P2 ends. When the second dead time period P2 ends, the inductor 16 begins to be charged, whereby the converter 10 in the fifth output mode has voltage error during the second dead time period P2, as shown by the oblique line region in FIG. 5A.

When the first current value $I_1$ is negative but the second current value $I_2$ is positive in the sixth output mode, the polarity of the inductor current i of the inductor 16 is negative during the second dead time period P2 (that is, the first current value $I_1$ is negative), as shown in FIG. 5B. During the second dead time period P2, the inductor 16 continues discharging until the inductor current i of the inductor 16 becomes zero (i.e. the output voltage of the converter 10 is approximately equal to the input voltage of the converter 10). Since the inductor 16 starts being charged when the second dead time period P2 ends, the converter 10 in the sixth output mode has voltage error during the second dead time period P2, as shown by the oblique line region in FIG. 5B.

When the first current value $I_1$ is positive but the third current value $I_3$ is negative in the seventh output mode, the polarity of the inductor current i of the inductor 16 is positive during the second dead time period P2, that is, the first current value $I_1$ is positive. Herein, the inductor 16 begins discharging until the inductor current i of the inductor 16 becomes zero (that is, the output voltage of the converter 10 is approximately equal to the input voltage of the converter 10), as shown in FIG. 5C. Since the inductor 16 starts being charged after the second dead time period P2, the converter 10 in the third output mode has voltage error during the second dead time period P2, as shown by the oblique line region in FIG. 5C.

When the first current value $I_1$ and the third current value $I_3$ are positive in the eighth output mode, the polarity of the inductor current i of the inductor 16 is positive during the second dead time period P2, the inductor 16 starts discharging, as shown in FIG. 5D. Since the inductor current i of the inductor 16 is still positive when the second dead time period P2 ends, the converter 10 in the eighth output mode has no voltage error during the second dead time period P2.

In step S37, calculate the voltage compensation value ΔV according to the voltage compensation model indicated by the output mode, the first current value $I_1$, and the second current value $I_2$ or the third current value $I_3$. For example, as shown in FIG. 5A to FIG. 5D, when the first current value $I_1$ and the second current value $I_2$ are negative in the first output mode, the fifth output mode indicates the voltage compensation model as follows:

$$\Delta V = 4 E_{dc} \frac{T_{dt}}{T_s}.$$

When the first current value $I_1$ is negative but the second current value $I_2$ is positive in the sixth output mode, the sixth output mode indicates the voltage compensation model as follows:

$$\Delta V = \frac{4E_{dc}|I_1| + 2(E_{dc} + E_s)I_2}{|I_1| + I_2} \frac{T_{dt}}{T_s}.$$

When the first current value $I_1$ is positive but the third current value $I_3$ is negative in the seventh output mode, the seventh output mode indicates the voltage compensation model as follows:

$$\Delta V = \frac{2(E_{dc} + E_s)|I_3|}{I_1 + |I_3|} \frac{T_{dt}}{T_s}.$$

When the first current value $I_1$ and the third current value $I_3$ are positive in the eighth output mode, the eighth output mode indicates the voltage compensation model as follows:

$$\Delta V=0.$$

In view of the above four voltage compensation models, $\Delta V$ represents the voltage compensation value, $I_1$ represents the first current value of the inductor current, $I_2$ represents the second current value of the inductor current, $I_3$ represents the third current value of the inductor current, $E_S$ represents an AC voltage of the supply mains, $E_{dc}$ represents the voltage on the input side Vin of the converter 10, $T_{dt}$ represents the second dead time period P2, and $T_s$ represents a switch cycle of the first switch module 12 or of the second switch module 14.

In this embodiment, the above four voltage compensation models are used for calculating the voltage compensation value $\Delta V$ when the first switch module 12 is switched off during the second dead time period P2. The voltage compensation value $\Delta V$ is the voltage increment caused by the delay of switching off the first switch module 12 during the second dead time period P2 and will cause the distortion of the current outputted by the inductor 16. Therefore, in step S39, adjust the switched-off time point of the first switch module 12 according to the increased voltage compensation value $\Delta V$ during a next dead time period.

Figure 6:
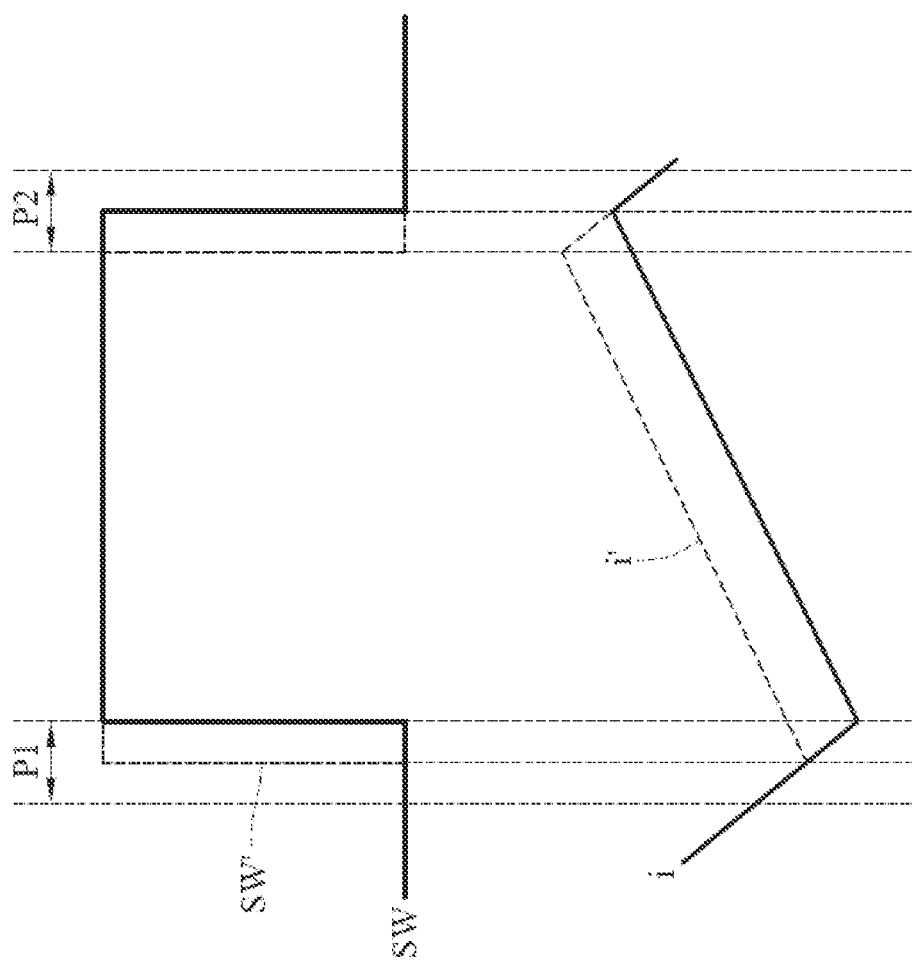
FIG. 6 is a schematic diagram of compensating an output current via an inductor according to an embodiment of the disclosure.

Please refer to FIG. 2 and FIG. 6. FIG. 6 is a schematic diagram of compensating an output current via an inductor according to an embodiment of the disclosure. When the switched-on time point of the first switch module 12 is later than a preset switched-on time point in the first dead time period P1, it means there is voltage loss happened to the converter 10. Therefore, after the voltage compensation value $\Delta V$ is obtained in step S37, the converter 10 will calculate the switched-off time point of the first switch module 12 in the second dead time period P2 according to the voltage compensation value $\Delta V$. In this embodiment, since the switched-on time point of the first switch module 12 is later than the preset switched-on time point, the switched-off time point of the first switch module 12 will be adjusted to be later than a preset switched-off time point in the second dead time period P2 to make the first switch module 12 is delayed to be switched off. During the delay of switching off the first switch module 12, the converter increases the voltage compensation value $\Delta V$ so that the inductor 16 can compensate the current loss in the first dead time period P1.

In the drawing, the dashed line represents the ideal curve of an inductor current i' of the inductor 16 in relation to an ideal switching signal SW' when the first switch module 12 and the second switch module 14 are on or off. When the first switch module 12 becomes on, the inductor 16 immediately begins to be charged. When the first switch module 12 becomes off, the inductor 16 immediately begins to discharge. In the drawing, the solid line represents the actual curve of the inductor current i of the inductor 16 in relation to an actual switching signal SW when the first switch module 12 and the second switch module 14 are on or off. During the process of switching on the first switch module 12, the inductor 16 is not immediately charged because of the delay of switching on the first switch module 12. During the process of switching off the first switch module 12, the converter 10 delays the switched-off time point of the first switch module 12 and the inductor 16 can continuously be charged, thereby compensating the inductor current i to reach the ideal inductor current i'. Notice that the current curves shown in FIG. 6 are examples to illustrate the difference between the actual inductor current and the ideal inductor current but will not limit the output current, i.e. the inductor current, in the disclosure.

Figure 7:
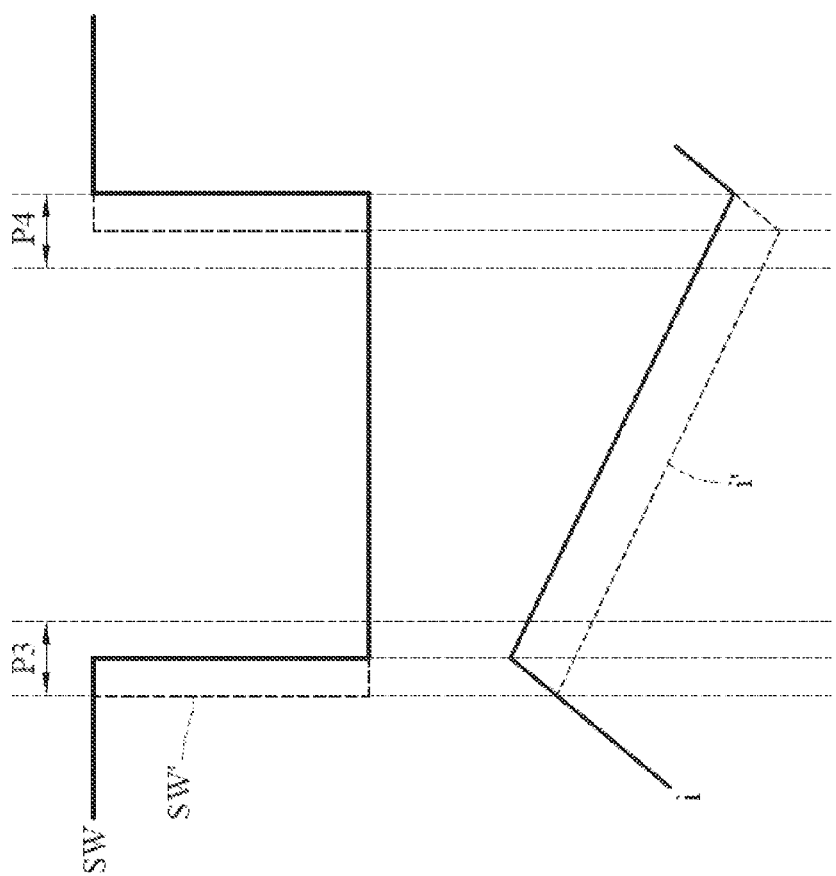
FIG. 7 is a schematic diagram of compensating an output current via an inductor according to another embodiment of the disclosure.

FIG. 7 is a schematic diagram of compensating an output current via an inductor according to another embodiment of the disclosure. When the switched-off time point of the first switch module 12 is later than a preset switched-off time point in the third dead time period P3, it means that the voltage on the capacitor 18 increases by the voltage compensation value $\Delta V$. Therefore, after the voltage compensation value $\Delta V$ is obtained in step S37, the converter 10 calculates the switched-on time point of the first switch module 12 in the fourth dead time period P4 according to the voltage compensation value $\Delta V$. In this embodiment, because the switched-off time point of the first switch module 12 is later than the preset switched-off time point, the switched-on time point of the first switch module 12 will be adjusted to be later than a preset switched-on time point during the fourth dead time period P4, to make the first switch module 12 is delayed to be switched on. During the delay of switching on the first switch module 12, the voltage on the inductor 16 decreases by the voltage compensation value $\Delta V$ so that the inductor 16 can compensate the current increased in the third dead time period P3.

In the drawing, the dashed line represents the ideal curve of an inductor current i' of the inductor 16 in relation to an ideal switching signal SW' when the first switch module 12 and the second switch module 14 are on or off. When the first switch module 12 becomes off, the inductor 16 immediately begins discharging. When the first switch module 12 becomes on, the inductor 16 immediately begins being charge. In the drawing, the solid line represents the actual curve of the inductor current i of the inductor 16 in relation to an actual switching signal SW when the first switch module 12 and the second switch module 14 are on or off. During the process of switching off the first switch module 12, because of the delay of switching off the first switch module 12, the inductor 16 will not immediately discharge, resulting in that the actual inductor current exceeds an ideal inductor current. During the process of switching on the first switch module 12, since the converter 10 delays the switched-on time point of the first switch module 12, the inductor 16 will continue discharging, thereby compensating the inductor current i to reach the inductor current i'. Notice that the current curves shown in FIG. 7 are examples to illustrate the difference between the actual inductor current and the ideal inductor current but will not limit the output current, i.e. the inductor current, in the disclosure.

As set forth above, the disclosure provides the aforementioned voltage compensating method applied to a converter. In the first embodiment of the voltage compensating method, the voltage compensation value for compensation is calculated and obtained in the front half-cycle to switching on the first switch module, i.e. the first dead time period that the first switch module is switched on. Moreover, the switched-on time point of the first switch module is delayed in the back half-cycle to switch on the first switch module, i.e. the second dead time period that the second switch module is switched on. Therefore, the output voltage of the converter can be compensated by the voltage compensation value which is the voltage loss during the front half-cycle. In the second embodiment of the voltage compensating method, the voltage compensation value for compensation is calculated and obtained in the back half-cycle to switch off the first switch module, i.e. the third dead time period that the first switch module is switched off. Furthermore, the switched-off time point of the first switch module is delayed in the back half-cycle to switch off the first switch module, i.e. the fourth dead time period that the second switch module is switched off. Therefore, the output voltage of the converter can be compensated by the voltage compensation value that is the voltage increment during the front half-cycle. As a result, the output voltage of the converter can be compensated as well as the converter may have lower total harmonic distortion of current and higher performance.

What is claimed is:

1. A voltage compensating method applied to a converter that converts a DC voltage into an AC voltage, outputs the AC voltage to an external AC power source, and comprises a first switch module, a second switch module, and an inductor, the voltage compensating method comprising:
   detecting a first current value related to the inductor during a first dead time period;
   calculating a second current value and a third current value related to the inductor, according to the first current value;
   determining an output mode of the converter after the first dead time period according to polarities of the first current value, the second current value and the third current value, the output mode of the converter indicating a voltage compensation model;
   calculating a voltage compensation value according to the voltage compensation model, the first current value, and the second current value or the third current value; and
   adjusting a switching time for the first switch module and the second switch module according to the voltage compensation value during a second dead time period;
   wherein said adjusting the switching time for the first switch module and the second switch module according to the voltage compensation value comprises: when a switched-on time point of the first switch module is later than a preset switched-on time point during the first dead time period, calculating a switched-off time point of the first switch module in the second dead time period according to the voltage compensation value; and during the second dead time period, adjusting the switched-off time point of the first switch module to be later than a preset switched-off time point to delay switching off the first switch module, wherein the voltage compensation value increases by a voltage on the inductor during the delay of switching off the first switch module.

2. The voltage compensating method according to claim 1, wherein the first switch module is switched on during the first dead time period, and the second switch module is switched on during the second dead time period.

3. The voltage compensating method according to claim 2, wherein said calculating the second current value and the third current value comprises:
   calculating the second current value according to a following equation:

$$I_2 = I_1 - \frac{E_s + E_{dc}}{L_f} T_{dt}; \text{ and}$$

calculating the third current value according to a following equation:

$$I_3 = I_1 - \frac{E_s - E_{dc}}{L_f} T_{dt},$$

wherein I1 represents the first current value, I2 represents the second current value, I3 represents the third current value, ES represents an AC voltage of the external AC power source, Edc represents the DC voltage received by the converter, Lf represents an inductance value of the inductor, and Tdt represents the first dead time period.

4. The voltage compensating method according to claim 3, wherein in said determining the output mode of the converter according to the polarities of the first current value, the second current value and the third current value, when the first current value and the second current value are positive, the output mode indicates the voltage compensation model as follows:

$$\Delta V = -4 E_{dc} \frac{T_{dt}}{T_s},$$

wherein $\Delta V$ represents the voltage compensation value, Edc represents the DC voltage received by the converter, Tdt represents the first dead time period, and Ts represents a switch cycle of the first switch module or of the second switch module.

5. The voltage compensating method according to claim 3, wherein in said determining the output mode of the converter according to the polarities of the first current value, the second current value and the third current value, when the first current value is positive but the second current value is negative, the output mode indicates the voltage compensation model as follows:

$$\Delta V = -\frac{4E_{dc} I_1 + 2(E_{dc} - E_s)|I_2|}{I_1 + |I_2|} \frac{T_{dt}}{T_s},$$

wherein $\Delta V$ represents the voltage compensation value, I1 represents the first current value, I2 represents the second current value, ES represents the AC voltage of the external AC power source, Edc represents the DC voltage received by the converter, Tdt represents the first dead time period, and Ts represents a switch cycle of the first switch module or of the second switch module.

6. The voltage compensating method according to claim 3, wherein in said determining the output mode of the converter according to the polarities of the first current value, the second current value and the third current value, when the first current value is negative but the third current value is positive, the output mode indicates the voltage compensation model as follows:

$$\Delta V = -\frac{2(E_{dc} - E_s)I_3}{|I_1| + I_3} \frac{T_{dt}}{T_s}$$

wherein $\Delta V$ represents the voltage compensation value, I1 represents the first current value, I3 represents the third current value, ES represents the AC voltage of the external AC power source, Edc represents the DC voltage received by the converter, Tdt represents the first dead time period, and Ts represents a switch cycle of the first switch module or of the second switch module.

7. The voltage compensating method according to claim 3, wherein in said determining the output mode of the converter according to the polarities of the first current value, the second current value and the third current value, when the first current value and the third current value are negative, the output mode indicates the voltage compensation model as follows:

$$\Delta V = 0,$$

wherein $\Delta V$ represents the voltage compensation value.

8. The voltage compensating method according to claim 1, wherein the first switch module is switched off during the first dead time period, and the second switch module is switched off during the second dead time period.

9. The voltage compensating method according to claim 8, wherein said calculating the second current value and the third current value comprises:

calculating the second current value by a following equation:

$$I_2 = I_1 - \frac{E_s - E_{dc}}{L_f} T_{dt}; \text{ and}$$

calculating the third current value by a following equation:

$$I_3 = I_1 - \frac{E_s + E_{dc}}{L_f} T_{dt},$$

wherein I1 represents the first current value, I2 represents the second current value, I3 represents the third current value, ES represents an AC voltage of the external AC power source, Edc represents the DC voltage inputting into the converter, Lf represents an inductance value of the inductor, and Tdt represents the first dead time period.

10. The voltage compensating method according to claim 9, wherein in said determining the output mode of the converter according to the polarities of the first current value, the second current value and the third current value, when the first current value and the second current value are negative, the output mode indicates the voltage compensation model as follows:

$$\Delta V = 4 E_{dc} \frac{T_{dt}}{T_s}$$

wherein $\Delta V$ represents the voltage compensation value, Edc represents the DC voltage received by the converter, Tdt represents the first dead time period, and Ts represents a switch cycle of the first switch module or of the second switch module.

11. The voltage compensating method according to claim 9, wherein in said determining the output mode of the converter according to the polarities of the first current value, the second current value and the third current value, when the first current value is negative but the second current value is positive, the output mode indicates the voltage compensation model as follows:

$$\Delta V = \frac{4 E_{dc}|I_1| + 2(E_{dc} + E_s)I_2}{|I_1| + I_2} \frac{T_{dt}}{T_s}$$

wherein $\Delta V$ represents the voltage compensation value, I1 represents the first current value, I2 represents the second current value, ES represents the AC voltage of the external AC power source, Edc represents the DC voltage received by the converter, Tdt represents the first dead time period, and Ts represents a switch cycle of the first switch module or of the second switch module.

12. The voltage compensating method according to claim 9, wherein in said determining the output mode of the converter according to the polarities of the first current value, the second current value and the third current value, when the first current value is positive but the third current value is negative, the output mode indicates the voltage compensation model as follows:

$$\Delta V = -\frac{2(E_{dc} - E_s)I_3}{|I_1| + I_3} \frac{T_{dt}}{T_s}$$

wherein $\Delta V$ represents the voltage compensation value, I1 represents the first current value, I3 represents the third current value, ES represents the AC voltage of the external AC power source, Edc represents the DC voltage received by the converter, Tdt represents the first dead time period, and Ts represents a switch cycle of the first switch module or of the second switch module.

13. The voltage compensating method according to claim 9, wherein in said determining the output mode of the converter according to the polarities of the first current value, the second current value and the third current value, when the first current value and the third current value are positive, the output mode indicates the voltage compensation model as follows:

$$\Delta V = 0,$$

wherein $\Delta V$ represents the voltage compensation value.

14. A voltage compensating method applied to a converter that converts a DC voltage into an AC voltage, outputs the AC voltage to an external AC power source, and comprises a first switch module, a second switch module, and an inductor, the voltage compensating method comprising:

detecting a first current value related to the inductor during a first dead time period;

calculating a second current value and a third current value related to the inductor, according to the first current value;

determining an output mode of the converter after the first dead time period according to polarities of the first current value, the second current value and the third current value, the output mode of the converter indicating a voltage compensation model;

calculating a voltage compensation value according to the voltage compensation model, the first current value, and the second current value or the third current value; and adjusting a switching time for the first switch module and the second switch module according to the voltage compensation value during a second dead time period;

wherein said adjusting the switching time for the first switch module and the second switch module according to the voltage compensation value comprises: when a switched-off time point of the first switch module is later than a preset switched-off time point during the first dead time period, calculating a switched-on time point of the first switch module in the second dead time period according to the voltage compensation value; and adjusting the switched-on time point of the first switch module to be later than a preset switched-on time point in the second dead time period to delay switching on the first switch module, wherein the voltage compensation value decreases by a voltage on the inductor during the delay of switching on the first switch module.

\* \* \* \* \*